(12) United States Patent  
Tanizawa et al.

(10) Patent No.: US 7,793,009 B2  
(45) Date of Patent: Sep. 7, 2010

(54) PRINTER AND PERIPHERAL APPARATUS OF A COMPUTER FOR PRINTING AND STORING IMAGES

(75) Inventors: Toshihiro Tanizawa, Saitama (JP); Keiji Sumida, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 54 days.

(21) Appl. No.: 11/798,400

(22) Filed: May 14, 2007

(65) Prior Publication Data

US 2007/0214295 A1    Sep. 13, 2007

Related U.S. Application Data

(62) Division of application No. 09/949,820, filed on Sep. 12, 2001, now abandoned.

(30) Foreign Application Priority Data

Sep. 11, 2000    (JP) .............................. 2000-274377  
May 23, 2001    (JP) .............................. 2001-154631

(51) Int. Cl.  
  *G06F 3/00*    (2006.01)  
  *G06F 3/12*    (2006.01)

(52) U.S. Cl. ............................... 710/10; 710/8; 710/14; 358/1.13

(58) Field of Classification Search ................... 710/10, 710/8, 14; 358/1.13  
See application file for complete search history.

(56) References Cited

U.S. PATENT DOCUMENTS

| | | | |
|---|---|---|---|
| 5,978,551 A | 11/1999 | Koyama | |
| 6,119,132 A | 9/2000 | Kuwano | |
| 6,426,801 B1 | 7/2002 | Reed | |
| 6,498,658 B1 * | 12/2002 | Sekikawa | 358/1.16 |
| 6,564,016 B1 | 5/2003 | Nakajima et al. | |
| 2004/0179115 A1 | 9/2004 | Tomat et al. | |
| 2005/0254089 A1 * | 11/2005 | Oliver et al. | 358/1.16 |

FOREIGN PATENT DOCUMENTS

| | | |
|---|---|---|
| EP | 0838767 | 4/1998 |
| EP | 0844782 | 5/1998 |
| JP | 10-91380 | 4/1998 |

* cited by examiner

*Primary Examiner*—Niketa I Patel  
(74) *Attorney, Agent, or Firm*—Sughrue Mion, PLLC

(57) ABSTRACT

A printer comprises a card reader and a data writing unit. The card reader reads out an image stored in a memory card. The data writing unit writes the image, which is read out by the card reader, in a flexible disk to store this image. The printer is adapted to be controlled under a simultaneous print mode for simultaneously performing both of printing and storing the image. When an instruction for printing is given to the printer under the simultaneous print mode, printing the image on a recording paper is carried out. At the same time, storing the image in the flexible disk is simultaneously carried out.

14 Claims, 10 Drawing Sheets

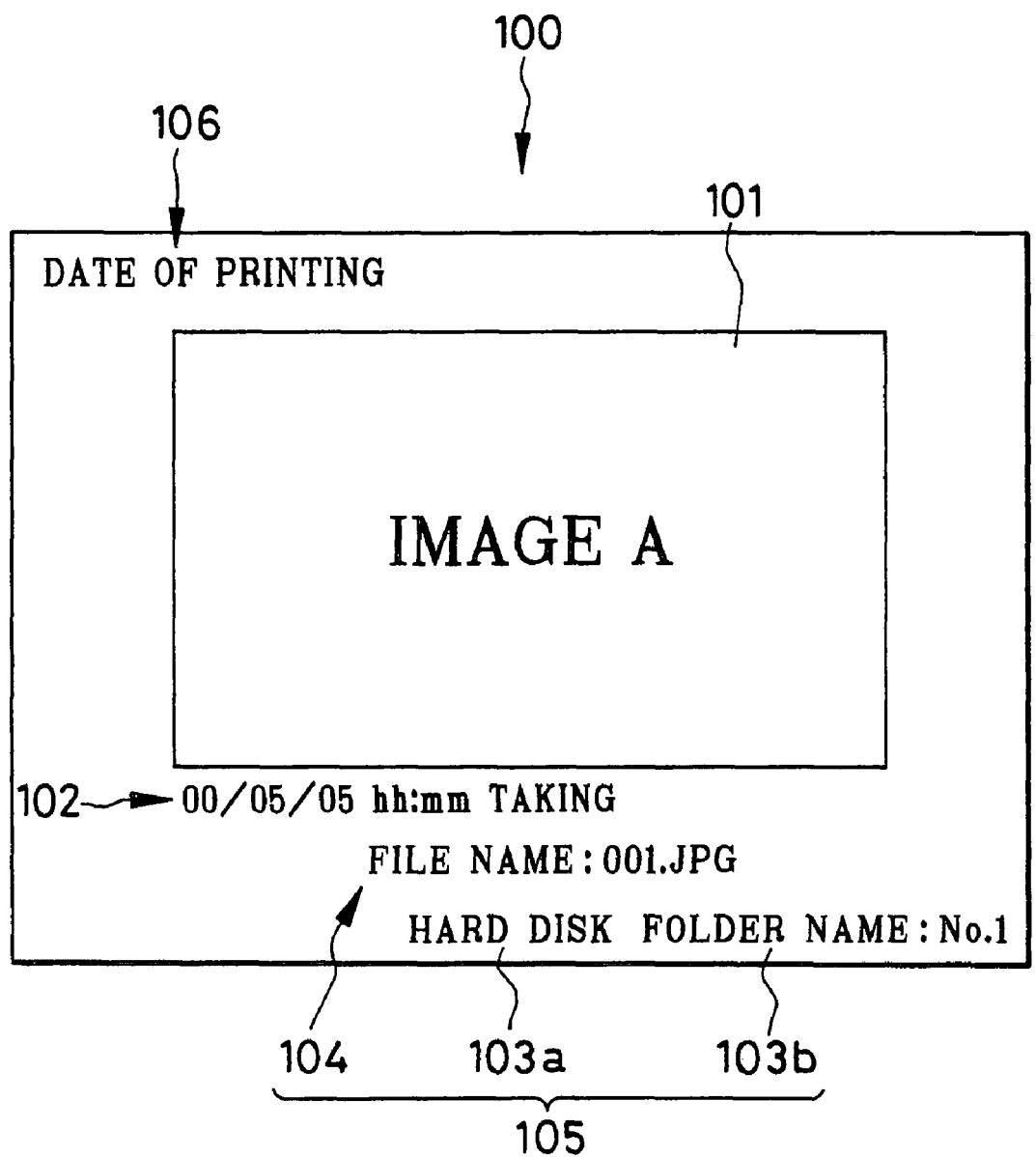

PRINTER AND PERIPHERAL APPARATUS OF A COMPUTER FOR PRINTING AND STORING IMAGES

This is a divisional of Application No. 09/949,820 filed Sep. 12, 2001 now abandoned. The entire disclosure of the prior application, application No. 09/949,820 is hereby incorporated by reference.

BACKGROUND OF THE INVENTION

1. Field of the Invention

The present invention relates to a printer which records an image on a recording paper in accordance with inputted image data, further, the present invention relates to a peripheral apparatus of a computer equipped with a plurality of functions.

2. Description of the Related Art

Nowadays an electronic still camera (digital camera) is tend to be speedily popularized in cooperation with development of the Internet. Image data taken by the digital camera is written in a memory card of smart media (registered trademark) and so forth. When a photographed image is printed, the digital camera is connected to a printer. In another way, the memory card detached from the digital camera is set to a printer provided with a card reader. Then, the image read from the memory card is printed. Such a printing operation includes an instruction of reading the images, a selection of the image to be printed, and an instruction of executing a printing process.

Meanwhile, when the photographed image is stored as a data file, the image read from the memory card is written in a storage medium of a flexible disk, a hard disk, and so forth by means of a data storage device. This data storage device is, for example, a flexible disk drive (FDD) and a hard disk drive (HDD) incorporated in a personal computer or the like. A data storing operation includes an instruction of reading the images, a selection of the image to be stored, and an instruction of executing a storage process.

By using the above-mentioned data storage device, it is possible to keep the image as the data file in addition to a print thereof. If the images are kept as the data file, the images may be easily managed so as to be arranged in an order of a taking date, and so as to be classified every photographing place and every event. Such management is very convenient. By the way, it is troublesome to marshal and keep the images with a personal computer. In order to simplify the management of the images, the present assignee has released an exclusive data filing apparatus in which a card reader and a data storage device are incorporated.

When the personal computer with a printer is connected to the digital camera to perform both operations of data storage and printing, it is necessary in each operation to give instructions of reading the image, selecting the image, and processing the image. Due to this, the operation becomes complicated.

Moreover, when the data filing apparatus is used together with the printer including the card reader, it is necessary to move the memory card because the printer and the data filing apparatus are individual. Due to this, the operation becomes further complicated.

Further, preparing the data filing apparatus besides the printer gives an economic load to a user. In addition, as a number of the apparatus increases, it is necessary to obtain a new space for placement. Thus, there arises a problem in that simplicity is taken away.

SUMMARY OF THE INVENTION

In view of the foregoing, it is a primary object of the present invention to provide a printer in which printing an image and storing image data may be simply and easily performed.

It is a second object of the present invention to provide a peripheral apparatus of a computer equipped with plural functions of a printing function, a data storing function and so forth, in which its manufacturing cost is prevented from increasing.

In order to achieve the above and other objects, the printer according to the present invention comprises an image-data writing unit for storing image data in a storage medium as an image data file. The storage medium is removably placed inside the printer. The storage medium, however, may be fixed in the printer.

In a preferred embodiment, the printer is adapted to be set in one of a print mode, a storage mode, and a simultaneous print mode. The print mode is for printing an image based on the image data. The storage mode is for storing the image data. The simultaneous print mode is for simultaneously performing both of printing and storing.

The peripheral apparatus of the computer according to the present invention comprises a communication unit for communicating with the computer, and a plurality of units working as peripheral units of the computer. The plural units are actuated in accordance with instructions sent from the computer via the communication unit. The peripheral apparatus further comprises a unit selecting device for selectively actuating the plural units.

The printer according to the present invention is provided with the image-data writing unit for storing the image in the storage medium as the image data file. Thus, it is possible to easily perform both of printing and storing the image without preparing a data filing device and a personal computer.

The simultaneous print mode is equipped in order to simultaneously perform both of printing and storing the image so that printing and storing the image are performed by a simple operation. Moreover, in case a taking date and a storage place of the image are printed together with the image, the image may be easily managed.

When the storage medium for storing the image has little remaining memory capacity, the image of the storage medium is printed from the old one and the printed image is deleted from the storage medium. By doing so, the remaining memory capacity is easily increased to keep the storage space for the new image data.

The peripheral apparatus of the computer according to the present invention comprises the unit selecting device for selectively actuating the plural units. In virtue of this, it is unnecessary to use a large-capacity power source and a high-performance CPU which are for simultaneously actuating the plural units. Hence, the manufacturing cost is prevented from increasing whereas many functions are equipped.

BRIEF DESCRIPTION OF THE DRAWINGS

The above objects and advantages of the present invention will become apparent from the following detailed description of the preferred embodiments of the invention when read in conjunction with the accompanying drawings, in which:

FIG. 6 shows an example in which information of a taking date etc. are printed together with the image;

DETAILED DESCRIPTION OF THE PREFERRED EMBODIMENT(S)

Figure 1:
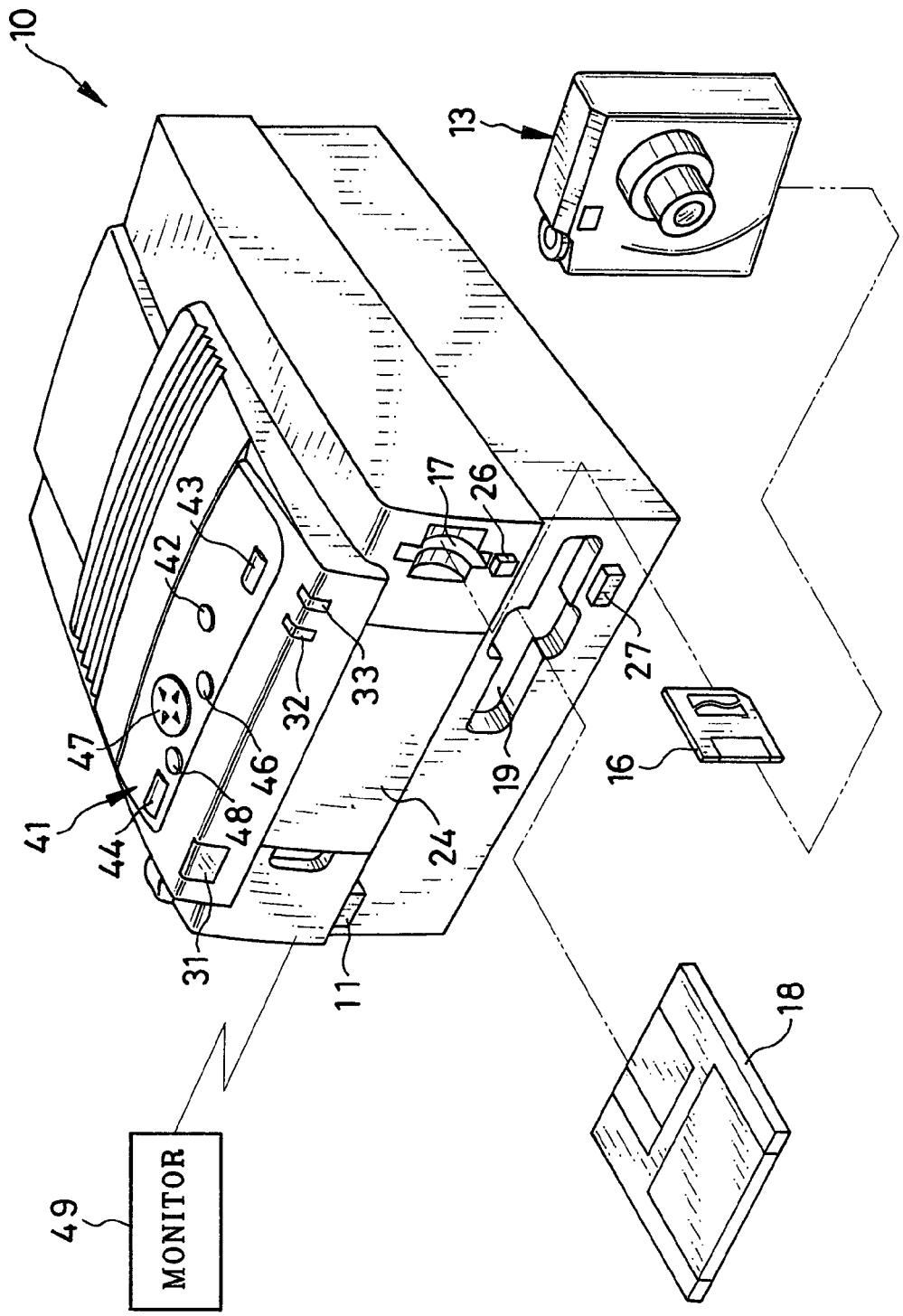
FIG. 1 is a perspective view of a printer.
Figure 2:
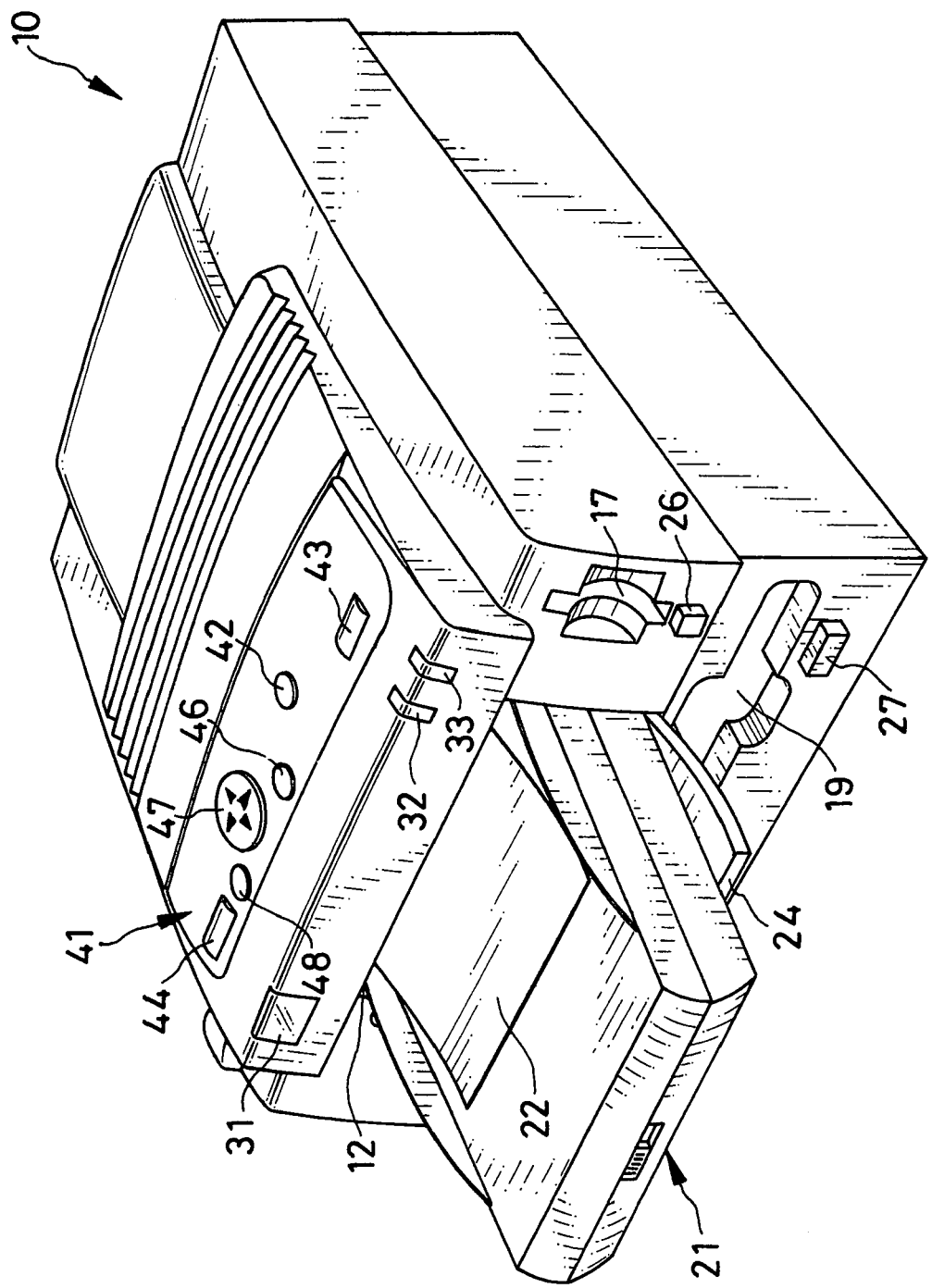
FIG. 2 is a perspective view of the printer loaded with a paper cassette.

As shown in FIGS. 1 and 2, a front face of a printer 10 is provided with a power switch 11, an opening 12, a first slot 17, and a second slot 19. A card reader unit is disposed behind the first slot 17. A flexible-disk driving unit (hereinafter, FDD unit) 81 is disposed behind the second slot 19 (see FIG. 3). A memory card 16 is inserted into the card reader unit. In the memory card 16, an image photographed by a digital camera 13 is stored. The card reader unit reads the image from the memory card 16.

A flexible disk 18 being as a data storage medium is removably contained in the FDD unit 81. This FDD unit is a data writing unit for storing the image, which is read from the card reader unit, in the flexible disk 18 as a data file. Under the first and second slots 17 and 19, are respectively provided buttons 26 and 27 for ejecting the memory card 16 and the flexible disk 18.

The printer 10 has a built-in hard-disk driving unit (hereinafter, HDD unit) 82 as a data writing unit (see FIG. 3). As well known, a hard disk being as a data storage medium is fixed in the HDD unit 82. The images stored in the flexible disk and the hard disk are read out for printing. At this time, the FDD unit and the HDD unit work as an image inputting unit.

A paper cassette 21 is removably set to the opening 12. This opening 12 also acts as a paper mouth for discharging a printed recording paper 22. A lid 24 is openably attached to the opening 12. When the printer 10 is not used, the opening 12 is adapted to be closed with the lid 24. Above the opening 12, are provided a light receiving portion 31, a warning lamp 32, and a status indicating lamp 33. The light receiving portion 31 receives a light signal from a remote controller used for a remote operation. The warning lamp 32 indicates a paper shortage and a paper jam. The status indicating lamp 33 indicates whether the printer 10 is normally operated or not.

An operation panel 41 is provided on an upper face of the printer 10. The operation panel 41 is provided with an image reading button 42, an output button 43, a mode setting switch 44, a determination button 46, an arrow button 47, and a menu selecting button 48. The printer 10 is connected to a monitor 49 displaying an operational picture and the read image. A user operates the printer 10 with the operation panel 41, watching the monitor 49. Regarding the monitor 49, it is possible to use a home-use television and a display of a personal computer. Thus, it is unnecessary to newly prepare an exclusive monitor.

The menu selecting button 48 is provided in order to select a print menu. As to the print menu, for instance, there is a one-frame print menu for printing a selected image on the recording paper 22. Besides this, there is an index print menu for printing an index image, in which thumbnail images are arranged in matrix, on the one-sheet recording paper 22.

In the memory card 16, image data (hereinafter main image data) used at the time of printing is stored every image. Moreover, thumbnail image data is also stored. The thumbnail image data is produced such that the main image data is downsized by reducing its resolution. Further, information of a taking date is annexed to each of the images.

The image reading button 42 is an instruction button for reading the image. When reading the image from the memory card 16, the thumbnail image data stored in the memory card 16 is read upon depression of the image reading button 42. Then the index image is displayed on the monitor 49. The arrow button 47 is for moving a cursor displayed on the monitor 49. The user sets the cursor to any image with the arrow button 47, watching the displayed index. The selected image is determined by depressing the determination button 46.

The output button 43 gives an instruction for printing the selected image. Further, the output button 43 also gives an instruction for storing the read image in the respective storage mediums, relative to the FDD unit 81 and the HDD unit 82. Upon depression of the output button 43, the main image data is read from the memory card 16 to execute both of a printing process and a storing process.

The mode setting switch 44 is for changing first to third modes of the printer 10. The first mode is a print mode for merely executing the printing process in which the image is recorded on the recording paper. The second mode is a storage mode for merely executing the storing process during which the image is saved in the data storing unit. The third mode is a simultaneous print mode for executing the printing process and the storing process at the same time.

Upon selecting either of the storage mode and the simultaneous print mode, a heading "designation of a storage place" is displayed on the monitor 49. When the cursor is set to this heading and the determination button 46 is depressed, a picture for selecting the storage place is displayed. In this picture, are displayed names of the writing units, for example, the FDD unit 81 and the HDD unit 82. The cursor is moved to one of the writing units and the determination button 46 is depressed. Upon this, the storage place is designated to the storage medium corresponding to the determined writing unit.

When the read image has a file name in advance, the image is stored with this file name. In case the read image does not have the file name, numbers are automatically given as the file name in an order of storage. The numbers are, for instance, 001, 002, 003, and so forth. Meanwhile, a folder may be made for each memory card 16 originally storing the image, and the respective files may be saved in the folder. In this case, similarly to the file name, numbers of No. 1, No. 2, No. 3 and so forth are automatically given as folder names in an order of drawing up. If a volume name showing ID information of the memory card 16 itself is given, this volume name may be used as the folder name.

With respect to a file format of the image data to be stored, a general format of an image file, for instance JPEG, is used. The image read from the memory card 16 is converted into this file format and is stored. In virtue of this, the image file stored in the flexible disk 18 is conveniently utilized by a personal computer or the like. It is needless to say that the image may be stored in an exclusive file format so as to be read only by the printer 10.

When the print mode is selected, a heading "designation of an image inputted place" is displayed on the monitor 49. The cursor is set to this heading and the determination button 46 is depressed. Then a picture for selecting the image inputted place is displayed. In this picture, are displayed the inputting units, for instance, the card reader unit, the FDD unit 81, and the HDD unit 82. The image inputted place is designated similarly to the designation of the storage place. When the image inputted place is designated, the file name recorded in the designated storage medium is displayed. If a folder is made in the storage medium, a folder name is displayed first when the image inputted place is designated. And then, the stored file name is displayed upon designation of the folder name. The cursor is moved to one of the file names and the determination button 46 is depressed. After that, the image reading button 42 is depressed to read the selected image.

Incidentally, the image inputted place is initially set to the card reader. Thus, it is unnecessary to designate the image inputted place when the image is read from the card reader unit. Moreover, when the card reader unit is designated, the whole images of the memory card 16 are read upon instruction of reading. Thus, it is also unnecessary to designate the file name.

Figure 3:
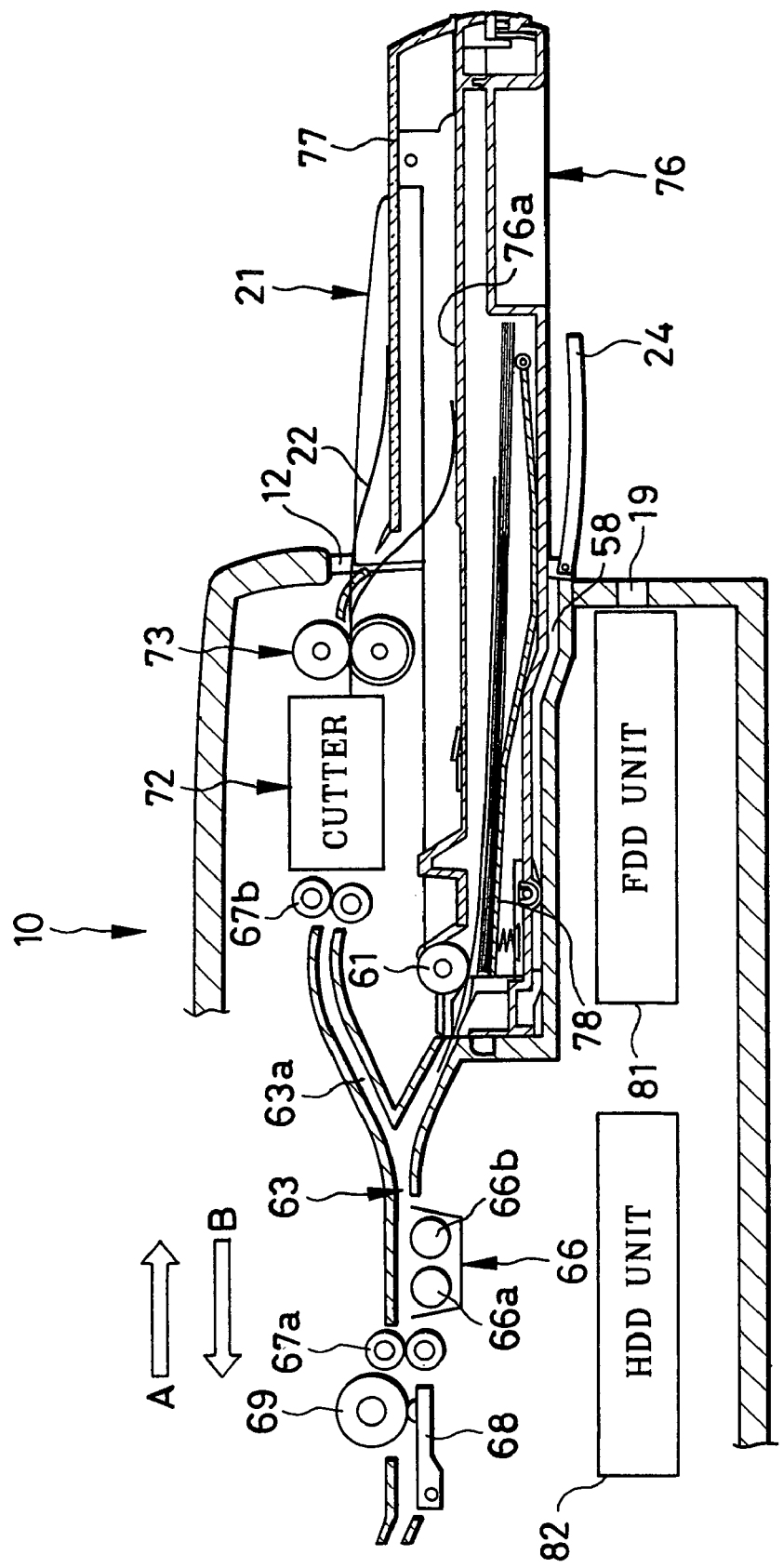
FIG. 3 is a sectional view of the printer.

In FIG. 3, the inside of the printer 10 is provided with a paper roller 61 behind a cassette containing chamber 58. The paper roller 61 is for drawing the recording paper 22 out of the paper cassette 21. The drawn recording paper 22 is conveyed through a conveyance passage 63 along which a fixing lamp 66, conveying roller pairs 67a and 67b, a thermal head 68, and a platen roller 69 are disposed. The thermal head 68 is opposite to the platen roller 69. The paper roller 61 and the conveying roller pairs 67a, 67b are actuated by a drive motor which is not shown. The printed recording paper 22 is conveyed through the conveyance passage 63 in a backward direction (shown by an arrow A) to be discharged from the opening 12 via a paper discharging passage 63a.

An extension to the paper discharging passage 63a is provided with a cutter 72 and a slitter 73. The cutter 72 cuts a front margin and a rear margin of the recording paper 22. The slitter 73 cuts margins of the recording paper 22 of both sides relative to a width direction. In virtue of the cutter 72 and the slitter 73, the obtained print does not have the margins surrounding the image. In case the print is instructed so as to have the margins, the cutter 72 and the slitter 73 are not actuated so that the recording paper 22 is discharged with the white margins surrounding the image.

As well known, the thermal head 68 is provided with a heating element array in which many heating elements are aligned in a main-scanning direction. The thermal head 68 thermally records three-color images of yellow, cyan and magenta in a frame sequential manner while the recording paper 22 is reciprocated in forward and backward directions shown by arrows A and B. The recording paper 22 is a well-known color-thermosensitive recording paper in which three thermosensitive coloring layers of cyan, magenta and yellow are stacked. The yellow thermosensitive coloring layer loses its coloring ability by applying ultraviolet lays of 420 nm. The magenta thermosensitive coloring layer loses its coloring ability by applying ultraviolet lays of 365 nm.

The fixing lamp 66 includes a yellow fixing lamp 66a and a magenta fixing lamp 66b. The yellow fixing lamp 66a radiates the ultraviolet lays of 420 nm toward the recording paper 22 to deprive the coloring ability of the yellow thermosensitive coloring layer after the yellow image has been thermally recorded in the yellow thermosensitive coloring layer. Further, the magenta fixing lamp 66b radiates the ultraviolet lays of 365 nm toward the recording paper 22 to deprive the coloring ability of the magenta thermosensitive coloring layer after the magenta image has been thermally recorded in the magenta thermosensitive coloring layer.

The paper cassette 21 comprises a cassette body 76 containing a stack of the recording papers 22, and an upper cover 77 provided at an upper portion of the cassette body 76. When the paper cassette 21 is set, the uppermost recording paper 22 abuts on the paper roller 61. Then, the paper roller 61 is rotated in a clockwise direction in the drawing to feed the uppermost recording paper 22 toward the conveyance passage 63. The inside of the cassette body 76 is provided with a plate 78 for pressing the recording paper 22 against the paper roller 61. Owing to the plate 78, the uppermost recording paper 22 is adapted to abut on the paper roller 61 at all times.

The top of the cassette body 76 becomes a cutoff accumulating portion 76a on which cutoffs cut by the cutter 72 and the slitter 73 are accumulated. A part of the cutoff accumulating portion 76a is covered with the upper cover 77 so as not to scatter the cutoffs to the outside of the cutoff accumulating portion 76a. Meanwhile, an upper surface of the upper cover 77 acts as a paper tray on which the discharged recording paper 22 is placed.

Figure 4:
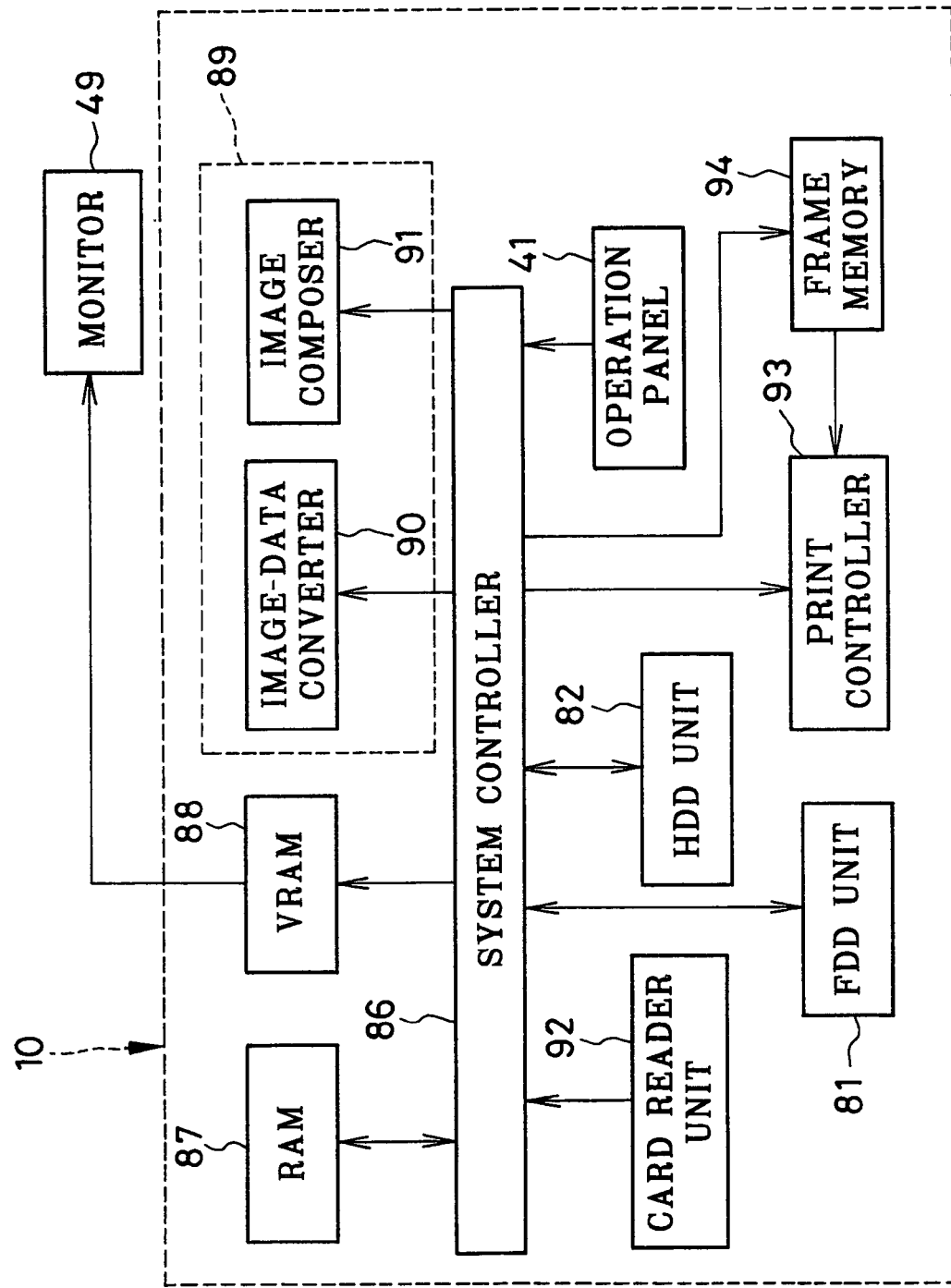
FIG. 4 is a block diagram showing electrical structure of the printer.

FIG. 4 shows an electrical structure of the printer 10. A system controller 86 is connected to a RAM 87, a VRAM (video memory) 88, an image processor 89, the card reader unit 92, the FDD unit 81, the HDD unit 82, a print controller 93, the operation panel 41, and a frame memory 94.

The image processor 89 includes an image-data converter 90 and an image composer 91. The image-data converter 90 executes γ-conversion and a color converting process (masking process) relative to the image read by the card reader unit 92. The γ-conversion is executed on account of spectral characteristics of an electronic still camera, and the color converting process converts the color into YMC. The image composer 91 produces the index image by composing the thumbnail image data which are included in the image data read by the card reader unit 92. Besides this, the image composer 91 processes the main image data so as to be combined with information of a taking date and so forth.

After the converting process and the composing process, the image is written in the VRAM 88 and the frame memory 94. The VRAM 88 is a memory for storing the image displayed on the monitor 49. The frame memory 94 is a memory for storing the image to be printed. Based on the data read from the frame memory 94, the thermal head 68 is driven. Incidentally, the RAM 87 is used as a memory for working at the time of the image converting process, the image composing process, and a command process.

The print controller 93 controls the respective sections of the thermal head 68, the fixing lamp 66, the conveying roller pairs 67a and 67b, the paper roller 61, the cutter 72, and the slitter 73.

Figure 5:
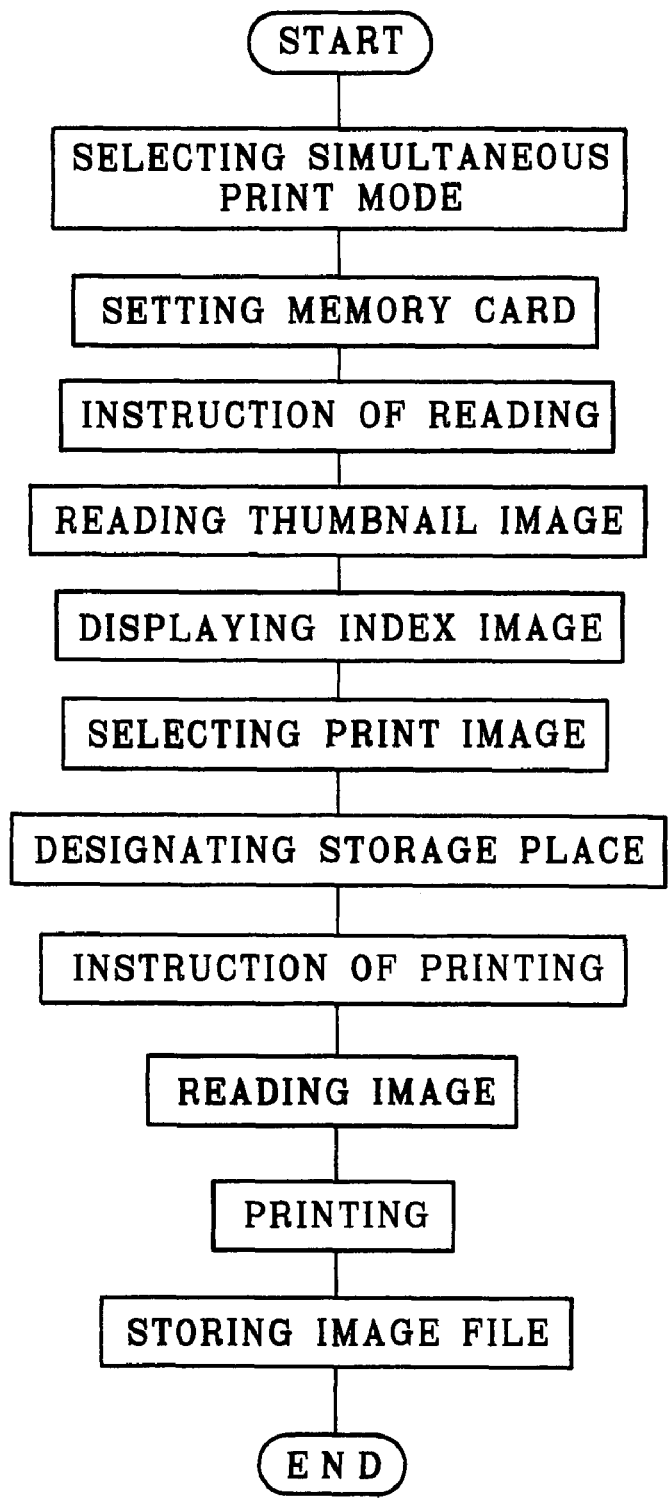
FIG. 5 is a flow chart showing a sequence of printing and storing an image.

An operation of the above structure is described below, referring to a flow chart shown in FIG. 5. After the power switch 11 has been turned on, the memory card 16 and the flexible disk 18 are inserted into the first slot 17 and the second slot 19 respectively. The memory card 16 stores the image and the flexible disk is used for saving the data. The lid 24 is opened to put the paper cassette 21 into the opening 12.

For example, the simultaneous print mode is selected with the mode setting switch 44. Upon depression of the image reading button 42, all of the thumbnail image data stored in the memory card 16 are read to display the index image on the monitor 49. The cursor is moved to a position of any image by using the arrow button 47. After that, the image is determined with the determination button 46. When the plural images are printed, the selection of the image is repeated.

The storage place of the image is designated, for instance, to the flexible disk 18. Upon depressing the output button 43, the main image data of the selected image is read from the memory card 16. The main image data is combined with the information of the taking date in the image composer 91 after the masking process has been executed in the image-data converter 90. Then, the main image data is written in the frame memory 94.

Based on the image data written in the frame memory 94, the thermal head 68 is driven for coloring and recording the image on the recording paper 22 one line by one line. The printed recording paper 22 is discharged through the opening 12 after cutting the margins with the cutter 72 and the slitter 73. Meanwhile, after executing the printing process, the image data in the frame memory 94 is outputted to the FDD unit 81 to be stored in the flexible disk 18. When the plural images are selected, the printing process and the storing process are repeated.

When only one of printing and storing is intended to be performed, either of the print mode and the storage mode is selected with the mode setting switch 44. In accordance with the selected mode, one of printing and storing is performed upon depressing the output button 43. If the print mode is designated, the respective steps of the simultaneous print mode are carried out except the storing process. If the storage mode is designated, the respective steps of the simultaneous print mode are executed except the printing process.

When printing the image stored in the flexible disk 18 and the hard disk, the print mode is selected first. After that, the image file to be printed is designated by the designating operation of the image inputted place. The corresponding image is displayed on the monitor 49. After confirming the displayed image, the output button 43 is depressed to print the selected image.

When the index image displayed on the monitor 49 is desired to be printed or to be stored, the index menu is selected with the menu selecting button 48. Upon depressing the output button 43, the index image is printed or is stored in accordance with the current mode.

In the above embodiment, the taking date is printed together with the image. However, the information of the taking date may not be printed. Alternatively, such as a picture print 100 shown in FIG. 6, a storage place 105 and a date of printing 106 may be printed together with an image 101 and a taking date 102. Moreover, a storage date may be also printed. As to the storage place 105, are displayed a storage medium (hard disk) 103*a*, a folder name (No. 1) 103*b*, a file name (001.JPG) 104, and so forth. In doing so, the storage place of the data file of the image 101 is easily known from the picture print 100 so that there is an advantage at the time of reprinting.

By the way, when the storage medium of the image is the removable flexible disk, a volume name representing ID information of the flexible disk itself may be printed on a label. By attaching this label to the flexible disk, finding the flexible disk becomes easy.

In the above embodiment, when the read image does not have the file name, the number is automatically given as the file name. However, if the printer is provided with a keyboard or is capable of connecting with a keyboard, it is possible to give a concrete file name, for instance, "Sports 1", "Excursion 1", "Travel 1", and so on. Incidentally, the keyboard may be displayed on the monitor 49. In this case, the file name may be inputted by picking the respective keys with the cursor.

The folder name may be given to the folder similarly to the file name. The folder may be classified and marshaled, giving a more concrete event name, for instance, "Sports", "Excursion", "Travel", and so on.

In the picture print 100 shown in FIG. 6, the image 101 is reduced to provide the margin around the image 101, in order to print the information of the taking date and so forth. This information, however, may be superposed on the image 101 without forming the margin.

In the above embodiment, although the image selected from the index image is printed and stored, a batch print menu and a batch storage menu are equipped. By these menus, all the images of the index display are simultaneously printed and stored by an operation in that the output button 43 is depressed once.

When reading the image stored in the flexible disk and the hard disk, all the images stored in the folder may be read in a lump by designating the folder. When the images are read in a lump, the index of the read images may be displayed on the monitor 49 similarly to the case in that the image is read from the memory card 16. Moreover, the read images may be printed in a lump. Further, when batch reading and batch printing are performed, the taking date may be designated instead of designating the folder. In this case, the images having the designated taking date are read and printed in a lump.

Figure 7A:
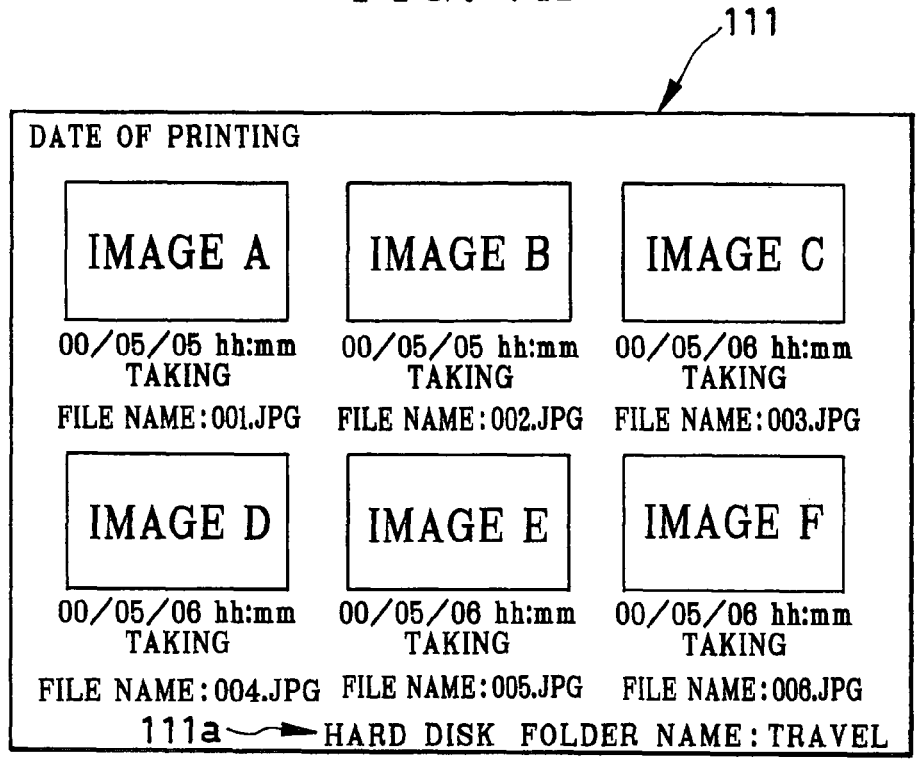
FIGS. 7A and 7B show examples of index prints in which taking dates and storage places are represented.
Figure 7B:
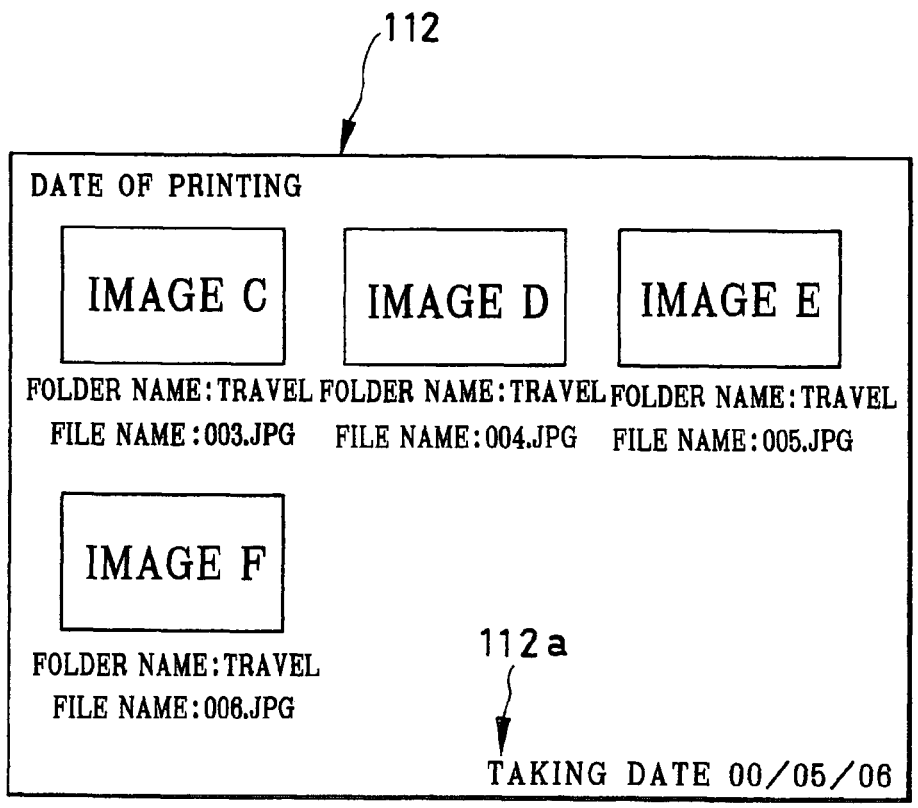

When the index image is printed, it is advantageous for managing the stored images to print a storage place 111*a* and a taking date 112*a*, such as index prints 111 and 112 shown in FIGS. 7A and 7B. As to the storage place 111*a*, are printed a name of a storage medium ("Hard Disk") and a name of a designated folder ("Travel").

In this way, the images are read from the flexible disk and the hard disk to produce the index image. In view of this, it is preferable to save the thumbnail image data besides the main image data relative to the image stored in the flexible disk 18 and the hard disk, similarly to the image stored in the memory card 16. By doing so, the index image can be rapidly produced.

In the above embodiment, the card reader is used as the image inputting device. Instead of the card reader, a personal computer connected to the printer via a cable may be used as the image inputting device. Further, a digital camera may be used as the image inputting device. In this case, the image can be printed and stored without drawing the memory card out of the digital camera. This is very convenience.

In the above embodiment, the FDD unit and the HDD unit are provided as the data writing units. However, either of them may be provided. Moreover, two or more units for writing the data may be provided. Instead of the flexible disk and the hard disk, the data writing unit may use storage mediums of a PC card, a recordable CD (Compact Disk), DVD (Digital Versatile Disk), MO (Magnetic Optical) disk, ZIP (trade name) disk, and so forth. Incidentally, the memory card may be used as the storage medium.

The flexible disk is the general one having memory capacity of about 1 MB. Instead of this, it is possible to use a high-capacity flexible disk having the same size with the general flexible disk and having memory capacity of about 200 MB. In this case, it is preferable that the FDD unit is available to both these flexible disks.

Figure 8:
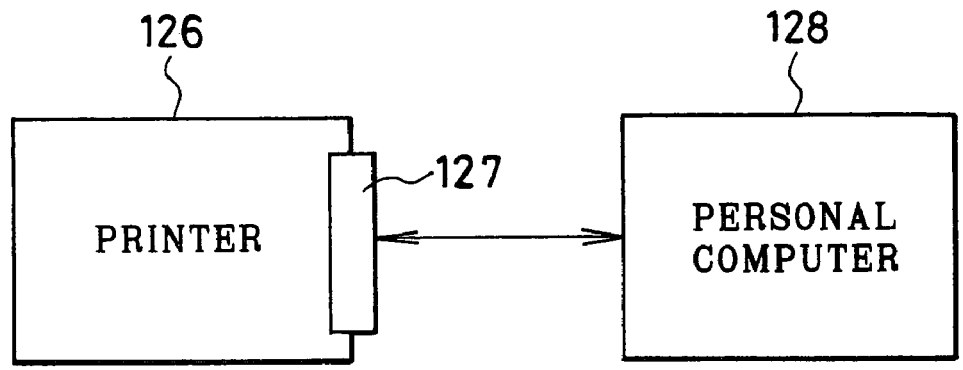
FIG. 8 is an explanatory illustration showing a connection of the printer and a personal computer.

In FIG. 8, a printer 126 is provided with a communication interface 127 for communicating with a personal computer 128. The image data is introduced from the personal computer 128 via the communication interface 127. The communication interface 127 includes a circuit board and a connector. The circuit board performs communication control based on a communication protocol, and the connector is for connecting a cable.

As to the communication interface 127, a parallel interface (IEEE1284-1994), which is a general interface for the printer and the personal computer, is used. Instead of this, are used interfaces being applicable to the various standards of RS232C, Ethernet (registered trademark), USB (Universal Serial Bus), IEEE1394, etc. Alternatively, radio communication may be adopted. In this case, it is possible to use communication interfaces being applicable to the standards of IEEE802.11, Bluetooth, and so forth. Moreover, it is possible to use a communication interface utilizing rays (for example, infrared rays) as a carrier wave.

Figure 9:
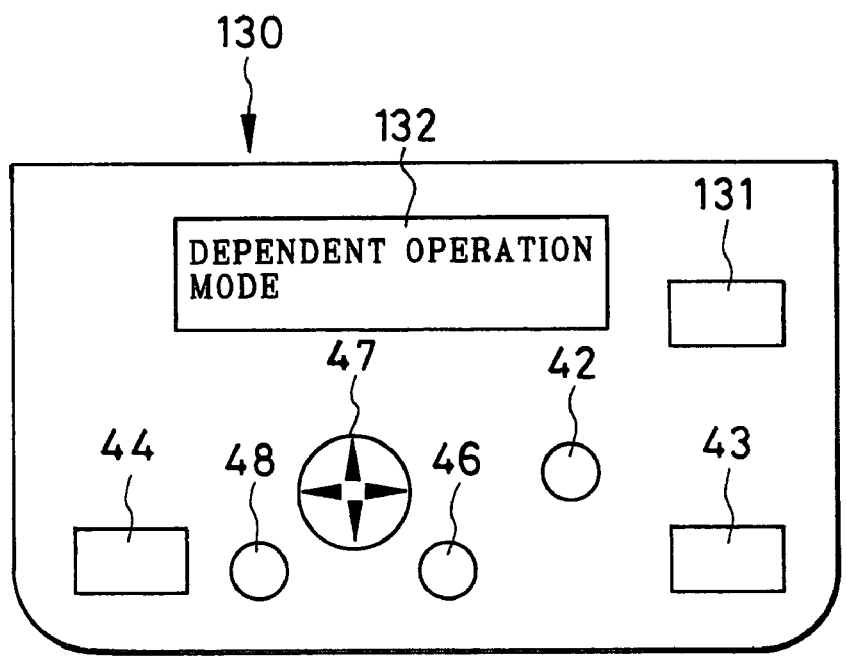
FIG. 9 is an explanatory illustration showing an operation panel of the printer shown in FIG. 8.

Meanwhile, the printer 126 may work as a peripheral apparatus of the personal computer 128 such that an instruction for operating the printer 126 is given from the personal computer 128 via the communication interface 127. In this case, such as shown in FIG. 9, an operation panel 130 is provided with a mode changing switch 131 by which an independent operation mode and a dependent operation mode are changed. Under the independent operation mode, the printer 126 is operated in response to an instruction given from the operation panel 130. Under the dependent operation mode, the printer 126 is operated in response to the instruction given from the personal computer 128.

The printer 126 contains a printing mechanism and a printer unit. The printing mechanism comprises the thermal head 68, the fixing lamp 66, the conveying roller pairs 67*a* and 67*b*, and so forth. The printer unit is constituted of the print controller 93 and the frame memory 94. Further, the printer 126 contains the FDD unit 81, the HDD unit 82, and the card reader unit 92. By using these units, printing is performed. Meanwhile, both of reading the image data from each storage medium and writing the image data are also performed.

In the independent operation mode, the system controller 86 controls the respective units on the basis of the instruction outputted from the operation panel 131. When the mode changing switch 131 is operated to change from the independent operation mode to the dependent operation mode, the system controller 86 invalidates the instruction outputted from the operation panel 130, and controls the respective units on the basis of the instruction outputted from the personal computer 128.

In the dependent operation mode, each of the units works as the peripheral apparatus of the personal computer 128. In other words, the printer unit works as a printer for printing the data of the personal computer 128, and the card reader unit 92 works as an external data-reading unit for inputting the data into the personal computer 128. The FDD unit 81 and the HDD unit 82 works as external recording units of the personal computer 128. In this dependent operation mode, the data inputted from each unit and outputted to each unit are not exclusive to the image data, but includes various data of text data, program data, and so forth.

A display 132 shows a picture for operation, an error message, a status, and so forth. The display 132 also shows that which mode of the dependent operation mode and the independent operation mode is selected. As to the display 132, an LCD is used, for example. By providing the display 132, it becomes possible to confirm the various operations and the statuses without connecting to the monitor 49.

As described above, the printer 126 is equipped with the dependent operation mode so that the printer 126 may be utilized as the peripheral apparatus of the personal computer 128 having different functions which are, for example, a printing function, a data reading function, and a data writing function.

The above embodiment is provided with the mode changing switch for changing the independent operation mode and the dependent operation mode. Instead of this, the mode may be automatically changed when it is detected that the communication interface 127 and the personal computer 128 are connected with the cable.

Under the dependent operation mode, the respective units of the printer 126 are adapted to be individually actuated by the instruction outputted from the personal computer 128. For example, when it is simultaneously performed to print a certain image and to save a document file in the flexible disk, the printer unit and the FDD unit 81 are individually actuated.

In this case, however, a power source having large capacity and a high-performance CPU are required so as to be capable of simultaneously actuating the units. Especially, when the printer unit is provided as one of the units working as the peripheral apparatus such as the printer 126, it is necessary to drive some mechanisms (a head driving mechanism, a recording-paper conveying mechanism, a cutter mechanism, etc.) in which a consumption amount of electric power is comparatively large. Therefore, the power source having large capacity is required in order to simultaneously actuate the printer unit and the other unit. In this case, manufacturing cost is likely to increase in accordance with increment of the cost for parts.

Figure 10:
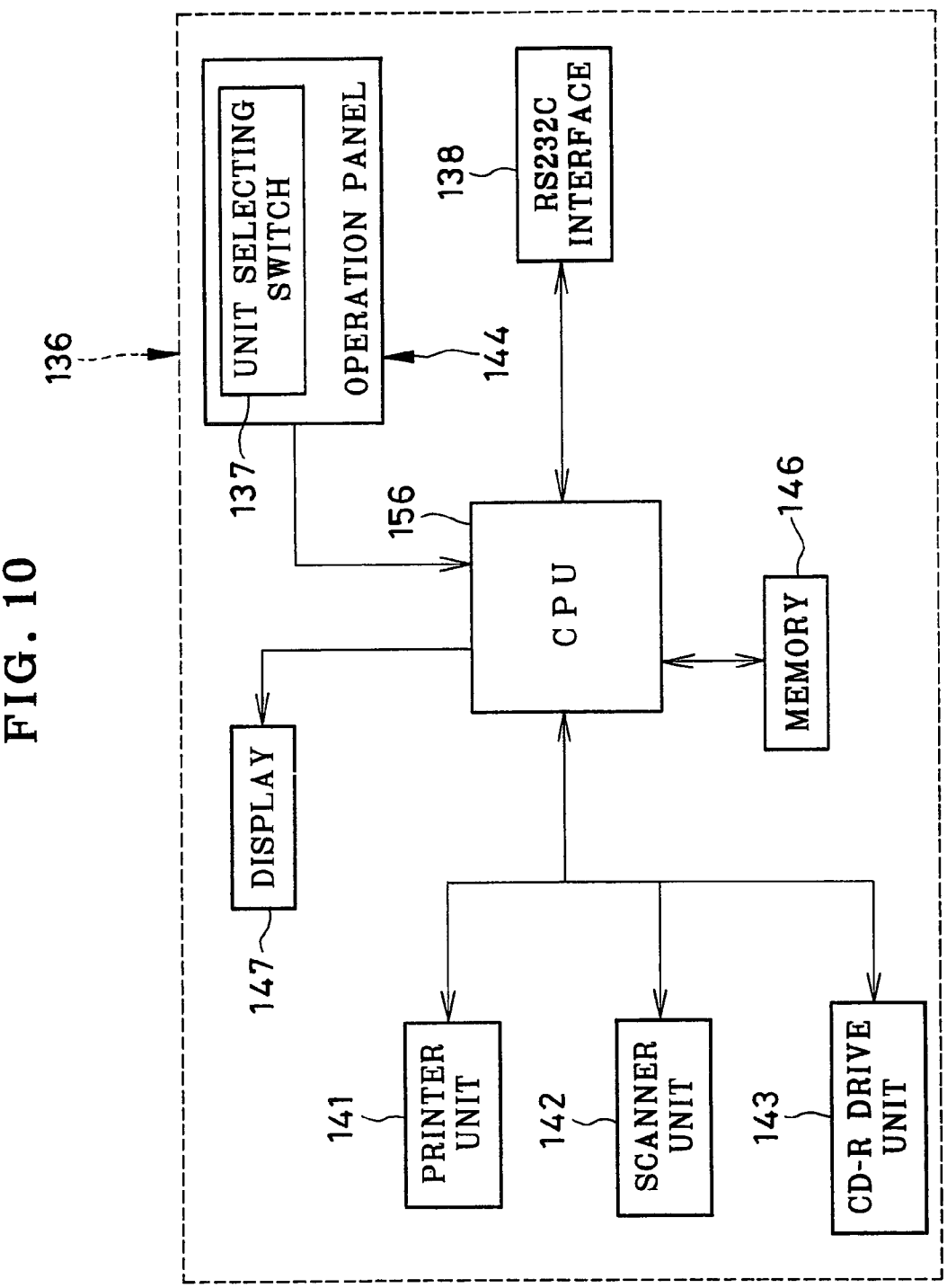
FIG. 10 is a block diagram of a peripheral apparatus.

In view of this, a peripheral apparatus 136 shown in FIG. 10 is further provided with a unit selecting switch 137 in order to prevent the manufacturing cost from increasing, whereas many functions are equipped. The peripheral apparatus 136 comprises a RS 232C interface 138 for communicating with the personal computer 128. A plurality of units working as the peripheral apparatuses of the personal computer 128 are a printer unit 141, a scanner unit 142 and a CD-R drive unit 143, for example. The scanner unit 142 inputs the image data of an original into the personal computer 128.

The unit selecting switch 137 is for selectively actuating the respective units 141, 142 and 143. In other words, among the units 141-143, only the unit selected by the unit selecting switch 137 is recognized by the personal computer 128 as the peripheral apparatus thereof. The selected unit is actuated in accordance with the instruction outputted from the personal computer 128.

In virtue of the unit selecting switch 137, it is avoided to simultaneously actuate all of the units 141-143. Thus, a power source having large capacity and a high-performance CPU are not required so that the manufacturing cost may be prevented from increasing, whereas the many functions are equipped. Moreover, it is not required for a CPU 156 to simultaneously control all of the units. Thus, a control program may be simplified so that producing cost of software may be prevented from increasing.

The CPU 156 is connected to the units 141-143, the RS232C interface 138, an operation panel 144, a memory 146, and a display 147. The CPU 156 controls the respective sections. The operation panel 144 is provided with a power switch and so forth besides the unit selecting switch 137. The display 147 shows a name of the unit selected by the unit selecting switch 137. Incidentally, the memory 146 stores a program for controlling the respective units 141 to 143.

When the printer unit 141 is selected by the unit selecting switch 137, the CPU 156 sends identifying information of the printer unit 141 to the personal computer 128. Owing to this, it is recognized that the operatable unit is the printer unit 141. The printer unit 141 is actuated based on the instruction sent from the personal computer 128. The instruction sent from the personal computer 128 is inputted into the CPU 156 via the RS232C interface 138. The CPU 156 controls the printer unit 141 in accordance with a command of the instruction. When either of the scanner unit 142 and the CD-R drive unit is selected, similar operation is carried out.

Figure 11:
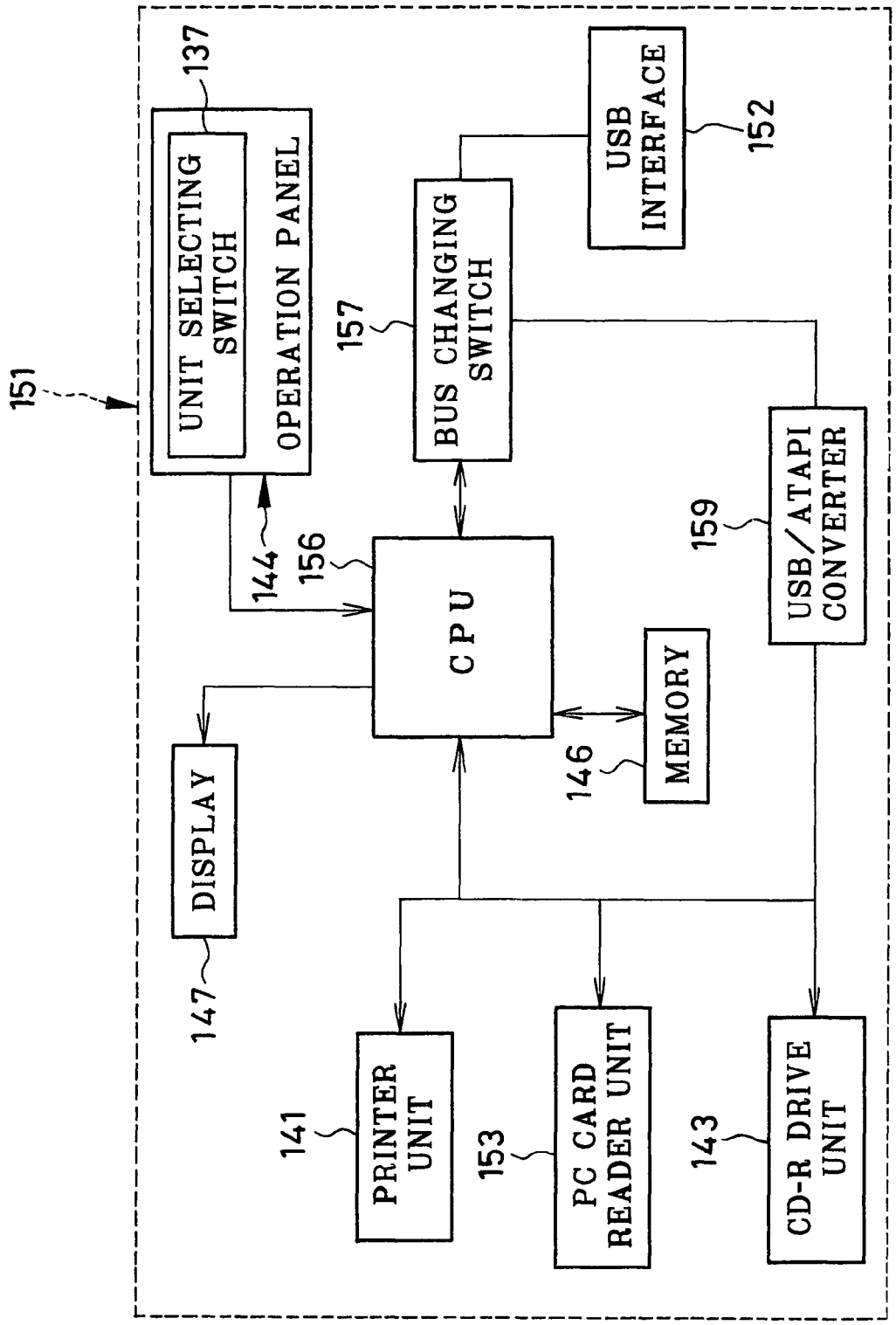
FIG. 11 is a block diagram of the peripheral apparatus using a USB interface as a communication interface.

A peripheral apparatus 151 shown in FIG. 11 is provided with a USB interface 152 being as the communication interface, instead of the RS232C interface. Further, a PC card reader unit 153 is provided instead of the scanner unit 142.

The CPU 156 controls the printer unit 141 and the PC card reader unit 153 based on the instruction sent from the personal computer 128. Meanwhile, the CD-R drive unit 143 is directly controlled by the personal computer 128.

A bus changing switch 157 changes internal buses which are signal-transmission lines between the USB interface 152 and the respective units 141, 153 and 143. When the CD-R drive unit 143 is selected by the unit selecting switch 137, the CPU 156 sends a setting signal to the bus changing switch 157. Based on the setting signal, the bus changing switch 157 changes the bus so as to directly input the instruction of the personal computer 128 into the CD-R drive unit 143 without passing through the CPU 156.

A USB/ATAPI converter 159 is a converting unit disposed between a signal line (bus) of the USB standard and a signal line (bus) of the ATAPI standard. The USB is the standard for the serial communication. The ATAPI is the standard for the parallel communication, and particularly is the interface standard applied for a data storing device, for instance, a built-in hard-disk drive and a built-in CD-R drive. Under the current ATAPI standard, it is possible to set a data transfer rate to 100 Mbps at its maximum. In comparison with a data transfer rate of the current USB standard (which is 12 Mbps), the ATAPI standard has advantage that the data transfer rate is fast.

The CD-R drive unit 143 is directly controlled by the personal computer 128 in the above way so that the CPU 156 does not need to control the CD-R drive unit 143. Thus, the CPU 156 does not require a program for controlling the CD-R drive unit 143. Consequently, the producing cost of the program may be decreased. Moreover, the program becomes simpler so that road of the CPU 156 may be reduced. Further, the data is transferred between the CD-R drive unit 143 and the personal computer 128 without passing through the CPU 156 so that it is possible to do the communication at a rapid speed.

In the above embodiment, the unit selecting switch is provided in a main body of the apparatus. However, the unit may be selected by an instruction sent from the personal computer. Moreover, in the above embodiment, the peripheral apparatus 136 and 151 are actuated only under the dependent operation mode. However, the independent operation mode may be equipped like the above-mentioned printer 126. In this case, it is necessary to provide an operating section and a mode changing member for individually actuating the plural units.

Incidentally, under the independent operation mode, the units are sequentially controlled by the CPU such as described in the forgoing embodiment of the printer 10. Concretely, the image data is read from the memory card and printing is performed. Thus, the respective units are not independently actuated. Even if the independent operation mode is selected relative to the peripheral apparatus, all of the units are not simultaneously actuated so that the power source having large capacity and the high-performance CPU are not required.

The printer and the peripheral apparatus of the above embodiment use the color thermosensitive recording paper which is heated by the thermal head to color the image for recording. Instead of such a printer, it is possible to adopt printers of a heat-transfer system, an ink-jet system, and a laser system. In the heat-transfer system, an ink ribbon is heated by a thermal head to transfer a melted ink to a recording paper for recording an image. In the ink-jet system, an ink is jetted toward a recording paper to record an image. In the laser system, a laser beam is irradiated toward a photosensitive drum to record a latent image, and a toner on the photosensitive drum is transferred to a recording paper to record an image.

In the above embodiment, the paper cassette is used. However, the recording paper may be manually fed. Moreover, in the above embodiment, the printer uses the recording paper which is cut into the regulation size in advance. However, the printer may use a roll paper in which a strip of the recording paper is wound in a roll form.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A printer including a connector for connecting a removable medium to said printer, a communication device for communicating with a computer, and an internal memory, comprising:

an operation panel for giving a first instruction to said printer;

a mode changing switch for changing an independent operation mode and a dependent operation mode, said printer being operated in accordance with said first instruction under said independent operation mode, and said printer being operated in accordance with a second instruction sent from said computer via said communication device under said dependent operation mode;

a device for storing image data of said computer in said internal memory; a device for storing image data of said removable medium in said internal memory;

a device for printing said image data stored in said internal memory; and a device for printing said image data of said removable medium; and wherein the mode changing switch is externally operated to change the printer operation mode between the independent operation mode and the dependent operation mode.

2. The printer according to claim 1, wherein said printer is connected to a monitor for displaying said image data stored in said internal memory of said printer.

3. The printer according to claim 1, wherein said printer has a simultaneous print mode for simultaneously performing both printing and storing images.

4. The printer according to claim 1, wherein a storage place and date of printing may be printed together with an image.

5. The printer according to claim 1, wherein said second instruction from said operation panel is invalidated in said dependent operation mode.

6. The printer according to claim 1, wherein the independent operation mode allows the printer to perform self contained printing, independent of external controls.

7. The printer according to claim 6, wherein a flexible disk drive or an internal memory is the source of data to be printed.

8. A printer including a communication device for communicating with a computer, and a plurality of units actuated in accordance with a first instruction which is sent from said computer via said communication device, said printer comprising:

a controller for controlling said units;

an operation member for giving a second instruction to said units via said controller;

a mode changing device for changing an independent operation mode and a dependent operation mode, said units being actuated in accordance with said second instruction of said operation member under said independent operation mode, and said units being actuated in accordance with said first instruction of said computer under said dependent operation mode; and a unit selecting device for selectively actuating said units under said dependent operation mode; and wherein the mode changing device is externally operated to change the printer operation mode between the independent operation mode and the dependent operation mode.

9. The printer according to claim 8, wherein a keyboard can be connected to the printer, wherein a user can name an image using the keyboard.

10. The printer according to claim 9, wherein the keyboard is displayed on a monitor.

11. The printer according to claim 8, wherein said second instruction from said operation panel is invalidated in said dependent operation mode.

12. The printer according to claim 8, wherein only one unit selected by said selection device actuates.

13. The printer according to claim 8, wherein the independent operation mode allows the printer to perform self contained printing, independent of external controls.

14. The printer according to claim 13, wherein a flexible disk drive or an internal memory is the source of data to be printed.

* * * * *